(12) United States Patent
May et al.

(10) Patent No.: US 6,566,656 B2
(45) Date of Patent: May 20, 2003

(54) PROBE STYLE RADIOMETER

(75) Inventors: Joe T. May, Leesburg, VA (US); Michael Scott Cain, Purcellville, VA (US); James M. Raymont, Sterling, VA (US); Christopher S. Rogers, Sterling, VA (US); Christopher S. Shorter, Aldie, VA (US)

(73) Assignee: Electronic Instrumentation & Technology, Inc., Sterling, VA (US)

( * ) Notice: Subject to any disclaimer, the term of this patent is extended or adjusted under 35 U.S.C. 154(b) by 0 days.

(21) Appl. No.: 09/725,771

(22) Filed: Nov. 30, 2000

(65) Prior Publication Data

US 2002/0063219 A1 May 30, 2002

(51) Int. Cl.⁷ .................................................. G01J 5/10
(52) U.S. Cl. ...................................................... 250/372
(58) Field of Search ........................................... 250/372

(56) References Cited

U.S. PATENT DOCUMENTS

| | | | |
|---|---|---|---|
| 4,128,461 A | * 12/1978 | Lerner et al. | 205/106 |
| 4,860,941 A | * 8/1989 | Otto | 228/180.5 |
| 5,044,755 A | * 9/1991 | Landa et al. | 356/440 |
| 5,319,437 A | * 6/1994 | Van Aken et al. | 356/326 |
| 5,697,373 A | * 12/1997 | Richards-Kortum et al. | 600/475 |
| 6,005,249 A | * 12/1999 | Hayes et al. | 250/372 |
| 6,332,092 B1 | * 12/2001 | Deckert et al. | 600/476 |

* cited by examiner

Primary Examiner—Constantine Hannaher
Assistant Examiner—Shun Lee
(74) Attorney, Agent, or Firm—Whitham, Curtis & Christofferson, PC

(57) ABSTRACT

A probe style radiometer includes a generally rectangular cross-sectional body and a probe having a square cross-section. The probe is preferably a hollow rod having a tip equipped with a UV-collecting aperture and a mirror. The mirror reflects UV light entering the aperture down the length of the rod to a detector in the body. A processor in the body then computes the amount of UV radiation based on signals from the detector. The amount may then be provided on a display integrated into the body. A ground quartz or glass window may be provided at the tip to seal the rod from exterior contamination and to diffuse the incoming UV radiation in a manner that will give the probe a near-cosine angular response. Filters within the radiometer body then filter this diffused radiation to the spectral region of interest. Preferably, the radiometer is battery powered and includes switches on the body to allow a user to control the mode of operation. To prevent electrical shock, the metal rod of the probe may contain an electrically non-conductive outer coating.

45 Claims, 6 Drawing Sheets

PROBE STYLE RADIOMETER

BACKGROUND OF THE INVENTION

1. Field of the Invention

The present invention generally relates to probe style radiometers, and more particularly to a high dynamic range, cost effective and safe probe radiometer for measuring ultraviolet (UV) radiation in a production environment.

2. Background Description

Use of ultraviolet light in the printing and coatings industry has grown rapidly over the past several years. Special ink and coating formulations will polymerize, or "cure," with exposure to light in the ultraviolet (UV) region of the spectrum. Measurement of the amount and intensity of UV exposure a product receives during the manufacturing process is paramount in establishing and maintaining process control. UV radiometers are used to measure the amount of UV light to which a product is exposed. There is much variation in the configuration of UV curing production lines. As a result, many different types of radiometers are used. The different configurations are driven by both physical considerations and by levels of UV irradiance.

One type of radiometer, which is often used to obtain UV readings in hard-to-reach locations, is the "probe" style of radiometer. The "probe" style radiometer typically consists of a long tube, which houses the light-capturing optics at the tip, and is connected to a body containing circuitry which measures the amount of UV light entering the tip of the instrument.

Most probe style radiomenters have their light sensing probes constructed using a quartz rod enclosed in a round stainless steel tube. This design has several problems. The first problem is cost and performance. The quartz rod must be constructed of high purity fused silica in order to provide high transmission to all wavelengths in the UV region. This drives the cost of the quartz rod upward, as the better the transmission the higher the cost. Moreover, a quartz rod may break if struck with a sharp blow. Other probe designs which use quartz fibers are not as susceptible to sharp blows but instead are very susceptible to changes in light output associated with bending of the fibers. Also, the fibers tend to be quite expensive when made of fused silica.

A second problem is related to the metallic surface of the sheath or cladding which encases the quartz rod or fibers. This metallic cladding presents serious electrical shock and arcing hazards when the probe is inserted into an operating UV environment. UV sources utilize high power inductors and capacitors, and high starting voltages and gas plasmas with up to 10 KW power potential. Contact by the operator with these sources is very hazardous. Further, shorting these power sources through a metal conductor to a machine body or other ground potential presents a hazardous arcing potential.

A third problem relates to the cross-sectional shape of the probe. Beacuse of their use of quartz rods and fibers, most probe designs have a round cross-section. This is undesirable since because rotation of the tip of the probe around its longitudinal axis will cause changes in the measured reading. The round cross-section thus makes it difficult for a user to precisely position the probe for properand consistent measurement.

SUMMARY OF THE INVENTION

It is an object of the present invention to provide an improved probe-style radiometer for detecting ultraviolet radiation, and more specifically one which is more economical to make and safer to use and demonstrates improved performance compared with conventional probe-style radiometers.

It is another object of the present invention to provide a probe-style radiometer having a probe rod which is made from an economical material that is resistant to breakage and which at the same time reliably captures and transmits all wavelengths in the ultraviolet region for detection.

It is another object of the present invention to provide a probe-style radiometer which is constructed to prevent a user from experiencing an electrical shock.

It is another object of the present invention to provide a probe-style radiometer which uses a probe rod having a cross-section which can be more precisely positioned by a user during UV detection, thereby enabling the invention to obtain a more accurate and consistent radiation reading compared with conventional probes with a round cross-section.

These and other objects of the invention are achieved by providing a radiometer which has a probe having a generally rectangular cross-section attached to a body which serves both as a handle and a housing for holding the probe electronics. A top surface and a bottom surface of the body preferably have larger width dimensions than the side or edge surfaces, and the overall dimensions of the body are selected to provide a comfortable fit in a user's hand.

The radiometer also includes a liquid crystal display (LCD) formed along one surface of the body, and control switches preferably in the form of two membrane pushbuttons along another one of the body surfaces. The pushbuttons may be located for convenient operation by the user's thumb or index finger. The body can be held either with an "over" or "under" hand type grip, so that the membrane switches are easy to operate with either hand. Information indicative of the UV irradiance detected by the probe is displayed on the LCD, as well as other information including modes of operation, units of measure, and other probe functions. The instrument is preferably battery powered and so that it does not require external wiring to a power source.

In use, the operator grasps the body of the probe in one hand and places the end of the measurement probe in the area in which the UV radiance is to be measured, which, for example, may be a UV curing chamber. Light enters the probe through a small aperture in the tip of the probe. The aperture admits all wavelengths into the interior of the probe through a ground quartz or glass diffuser window which seals the probe interior from outside solids, liquids and gases which may contaminate the interior of the probe and interfere with the UV radiation. The ground quartz or glass window also provides diffusion of the incoming rays so that the angular response of the probe is nearly cosine in nature. Light entering the probe window strikes a mirror inclined (e.g., at a 45° angle) to the quartz window, so that light striking the top surface of the probe is reflected down the length of the probe.

Circuitry within the body measures and displays, in numerical form, the UV irradiance collected at the tip. Irradiance, total energy, and time is measured and displayed on the LCD on the body. At the end of the probe, a UV filter eliminates all wavelengths except those of interest and allows the UV wavelengths to strike a silicon photodiode or other photodector. The photodetector converts the UV radiation into electrical current proportional to the UV radiation striking the detector. The current from the detector is preferably received by a very wide dynamic range (22-bit)

analog-to-digital (A/D) converter which converts the current to numerical form.

The invention includes several other features which are not used in conventional probe style radiometers. These include:

Very Wide Dynamic Range and Automatic Operation

The radiometer of the present invention has enhanced sensitivity which enables it to detect UV light in a range from several microwatts to ten watts. This wide dynamic range is accomplished automatically with no requirement by the user to switch gain settings of any kind. This is made possible by the integration of 400, filtered, 20-bit A/D samples/coupled with a software-controlled, 60:1 hardware gain range. Those skilled in the art can appreciate that other arrangements may also be used.

In accordance with microcontroller software, the display will automatically adjust itself with a floating decimal point and proper units to present information in either milliwatts or watts. Preferably, the LCD display display values as low as 0.001 $mW/cm^2$. If desired, the control software of the radiometer may automatically change UV detection ranges as the irradiance level in the measuring area is detected as changing. This auto-ranging may be achieved by the control software automatically adjusting the displayed data to provide the maximum displayed resolution without overloading the displayed range.

Implemented in the signal detection circuitry is a combination high resolution A/D converter and integrating amplifier. The amplifier portion of the A/D converter has a gain switching capability which is controlled by an on-board microcontroller. The microcontroller uses a signal processing algorithm to select the proper gain range, calibration method and filtering process to provide the user with a high dynamic gain range instrument which does not require user intervention.

Rigid Probe Design

The high cost of quartz rods or fibers used in conventional probe-style radiometers is avoided in the present invention by the use of a simple, inexpensive turning mirror placed at the light-sensing end of the probe. Light enters the probe tip where it strikes a mirror placed, for example, at a 45° angle and is reflected down the long axis of the probe (e.g., the light guide) to the body. From there, it passes through one or more filters and strikes a photodetector where it is converted to an electrical signal, and then that signal is processed to achieve a final UV radiation reading by the probe electronics.

In addition to cost savings, the design of the present invention is easier to assemble and more robust than a quartz rod which may break if struck a sharp blow. The preferably rectangular or square cross-section of the probe rod is also advantageous. The shape of the square probe, for example, allows for better control of rotational motion of the probe tip when in use; that is, when the probe is inserted into a square opening of an area containing UV radiation. Since the effective sensing area of the probe tip is approximately cosine in nature, rotating the tip while measuring a source will change the reading. It is therefore important that the tip not rotate while in use. The square shape when inserted in a slightly larger square hole assists the user in this task.

Electrically Isolated Probe

The probe design of the present invention avoids electrically-related hazards. Although the probe preferably has a metallic core, it is clad in a very hard, durable, electrically non-conductive coating which is able to withstand, for example, up to 5 KV and can operate in temperatures of up to 1200° F. This coating may, for example, be a ceramic-based material. The probe itself is also electrically isolated from the portion of the instrument in physical contact with the operator. The isolation is obtained by using an electrically non-conductive block that mechanically connects the probe to the instrument body.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
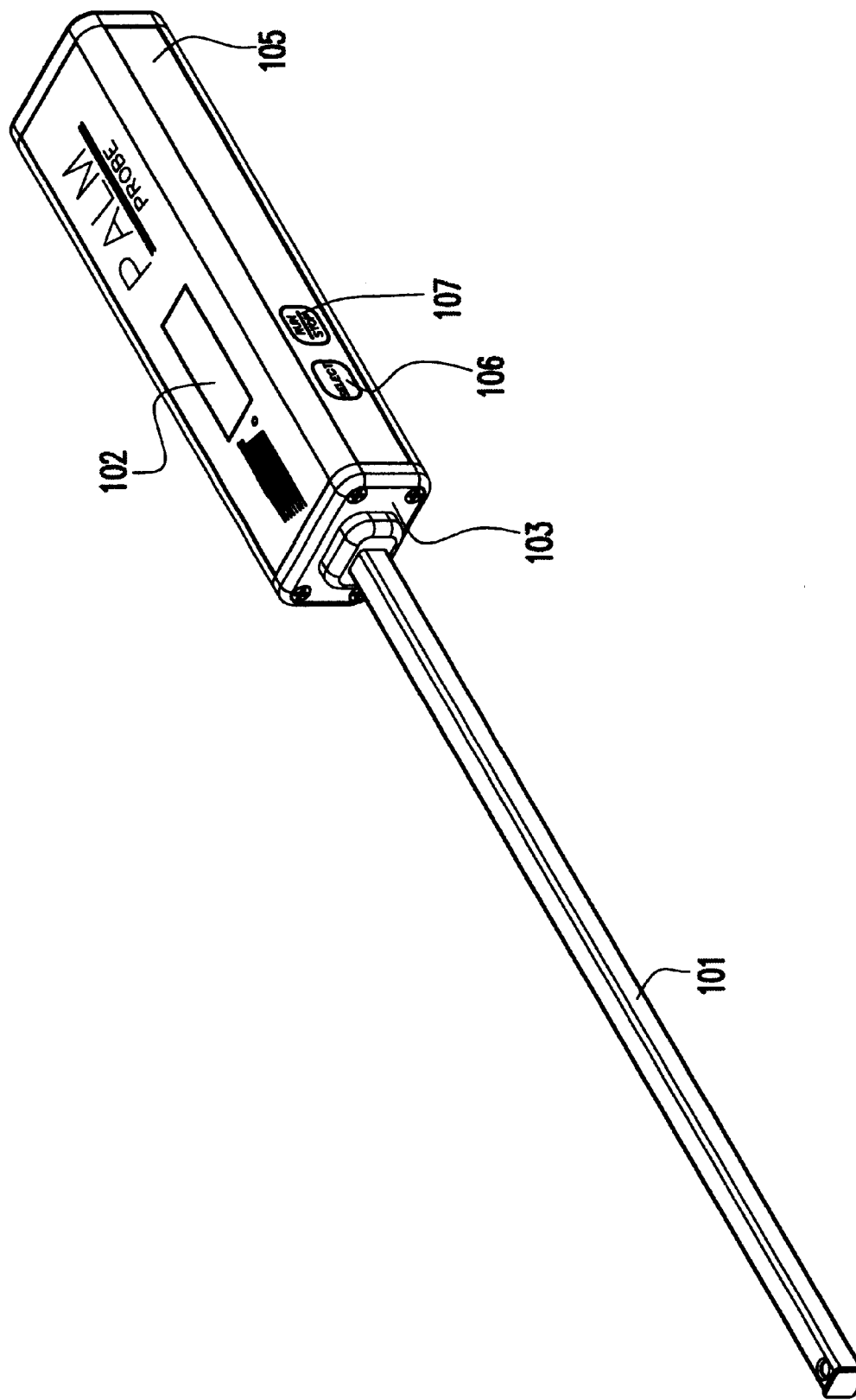
FIG. 1 is an isometric view of the probe style radiometer according to a preferred embodiment of the invention.

Referring now to the drawings and more particularly to FIG. 1, a probe style radiometer according to one embodiment of the invention includes a probe 101 and an instrument body 102. The probe may be a hollow rod made of a rigid material which is either conductive or nonconductive. Preferably, probe 101 is a hollow metal rod having a substantially rectangular cross-section. Alternatively, the rod may be filled with a light-guiding medium such as glass or optical fiber. For example, if desired, probe 101 may use as its internal light-guiding medium metal clad glass, quartz, or optical fiber. Further, for enhanced protection, the glass, quartz, or fiber may contain an insulating coating.

Body 102 contains optical and electronic circuitry for detecting and processing the ultaviolet radiation collected by the probe. The body also serves as a handle. Preferably, the body has physical dimensions which comfortably fit a user's hand. This may be achieved by constructing the body to also have a generally rectangular cross-section. To further enhance the comfort of holding the instrument, the corners of the body may be beveled or rounded.

As shown, probe 101 projects from a plate 103 attached to an end of body 102. At an opposite end of the body there is another end plate 104, which may be removable to allow for replacement of batteries. On a top surface of the body there is a liquid crystal display (LCD) 105, and on a right edge surface there are two switches 106 and 107 for controlling operation of the radiometer. Using the SELECT button 106, a user can cause the LCD 105 to display UV information in units of Watts-Joules-Seconds. Pressing the RUN/STOP button 107 will stop the collection of data and the highest irradiance value measured during the collection of data will be displayed. Preferably, the switches are membrane pushbuttons positioned to allow a user to press them with his or her thumb or index finger. With this design, the body may be held with an "over" or "under" hand type grip to allow the membrane switches to be easily operated with either hand.

Figure 2:
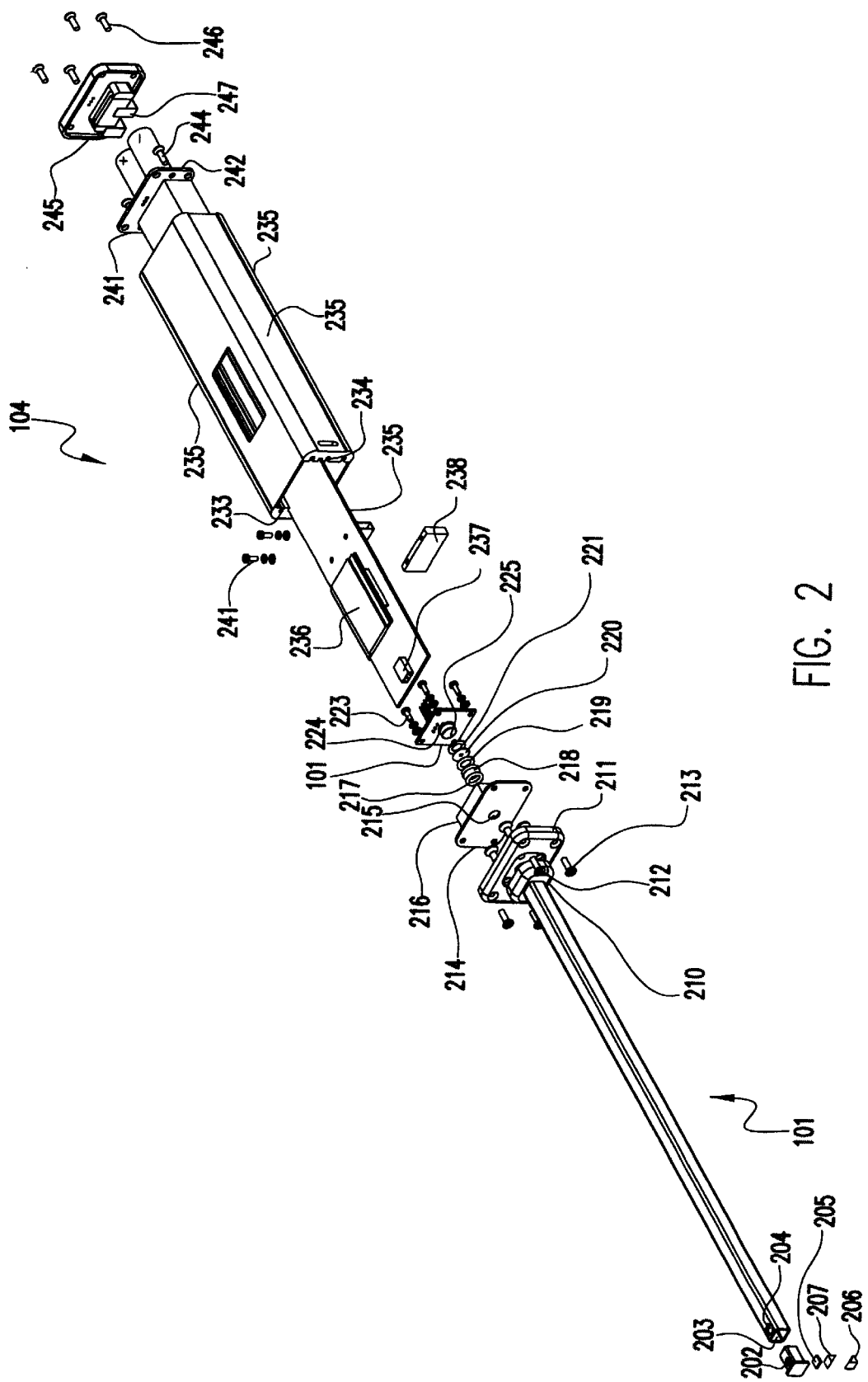
FIG. 2 is an exploded isometric view of the probe style radiometer showing its mechanical and optical construction.

FIG. 2 shows an exploded view of a mechanical and optical construction of the invention. This construction includes a probe 101 in the form of a tube that is substantially rectangular and preferably square in cross-section. The tube may be made of stainless steel clad in a very hard, durable and electrically non-conductive coating which will withstand up to 5 KV and can operate in temperatures of up to 1200° F.

Preferably, coating is ceramic based such as an aluminum oxide-based refractory ceramic coating. This coating may be applied by plasma deposition. The coating may also be porcelain enamel if a metal tube is used which can withstand a 1400° F. fusing temperature.

A distal end of the probe 101 is equipped with a light-collecting aperture 220 and optics for transferring this light to a detector in the radiometer body. Aperture 220 allows both UV and non-UV light to enter a light guide which runs a length of the probe. This light guide may be formed by the hollow interior walls of the probe. The optics may be incorporated within a window holder 202 which may be held in place by a machine screw or other suitable fastening means (not shown). If desired, window holder 202 may be press fit in the probe body 102.

Window holder 202 is adapted for insertion into an aperture 203 in the probe. The optics held by window holder 202 include a ground quartz or glass diffuser window 205 which may be a ground quartz or glass diffuse window, and first and second prisms 206 and 207, one of which 207 is mirrored along its diagonal surface to reflect radiation passing through window 205 down the length of the probe 101. The sensitivity of the probe may be gauged to detect ultraviolet radiation over a wide dynamic range, include the hostile environment that exists within a curing chamber to very docile environment including those where there are very low amounts of ultraviolet radiation such as found in ambient room light. This sensitivity range may be achieved by coupling a low-noise, high-resolution A/D converter with software which performs data filtering and hardware auto-gain ranging.

In operation, the window 205 provides sufficient diffusion of the incoming rays so that the angular response of the probe is nearly cosine in nature. This diffusion may be produced by roughening one surface of the window using an abrasive. As a result, light passing through the window strikes this roughened and irregular surface and is deflected in various directions. This produces the diffusion or scattering of light in a nearly cosine manner. Assembly of the probe tip is by insertion of the window 205 and prisms 206 and 207 in the order shown from the bottom of the window holder so that the window 205 covers and seals the aperture 204, and then the window holder 202 is pressed into the end of probe 101.

The opposite end of the body is provided with an integral flange 210 which is secured to an electrically non-conductive, mechanically desirable mounting block 211 by means of screws 212. The mounting block may be made from Garolite (phenolic resin), Derlin (acetal), Lexan (polycarbonate), ABS (acrylonitrile butadiene styrene), and Torlon (polymide). Mounting block 211 is, in turn, mounted to the instrument body side extrusions by screws 213. Screws 213 pass through a plate 214 which has an aperture 215 axially aligned with the probe and having an optics holder 216 integrally formed on one side thereof.

Within optics holder 216 are, in succession, a silicone or other UV-resistant O-ring 217, a filter 218, a second silicone or other UV-resistant O-ring 219, an aperture plate 220, and a Teflon® washer 221. These are held in place by a detector printed circuit board (PCB) 222 by screws 223. The detector PCB has an integral flange 224 which houses the photodetector 225 and compresses the O-rings 217 and 219.

The body further includes two side extrusions 231 and 232 each having rabbets formed along their internal edges to receive the top and bottom faces 233 and 234 of the body. The interior surfaces of extrusions 231 and 232 also have grooves. Facing grooves receive the main PCB 235 on which the electronics of the instrument are mounted, including the microcontroller 236. Also mounted on the main PCB 235 is a connector 237 which makes the connection between the detector PCB 222 and the circuitry on the main PCB. A battery bracket 238 is secured to the bottom of the main PCB 235 by means of screws 239. Screws 213 which secure the mounting block 211 to the main body are threaded into extrusions 231 and 232.

At the opposite end of the body is a battery holder 241 for holding batteries, e.g., AA size batteries 243. The battery holder also has an integral flange 242 inserted into the body and is secured to the body by screws 244 which pass through flange 242 into the side extrusions 231 and 232. The end of the body and the battery holder are closed by end cap 245, which is secured by screws 246 which are threaded into the side extrusions 231 and 232. A battery clip 247 is attached to the interior face of the end cap 245 to complete the electrical circuit to the batteries.

The top surface 233 of the body preferably includes a window 248 through which the LCD display may be viewed. The LCD display is shown in greater detail in FIG. 3. Here, the LCD is shown as a four-digit display with floating decimal point 301 and various indicators including units 302 which reflect the current reading in Watts, Joules or seconds. Other indicators include a UV bandwidth indicator 303 in which the radiometer is operating, a "RUN" indicator 304 which flashes when collecting data, a low-battery warning indicator 305, and a prove body temperature indicator 306 when the radiometer is in run mode. In operation, only the segments on the display which pertain to the current reading are made to be visible.

The sensitivity range of the radiometer is quite broad, measuring light from approximately 100 micro Watts/cm$^2$ ($\mu$W/cm$^2$) to 10 Watts/cm$^2$(W/cm$^2$) in the UVA (320–390 nm), UVB(270–320 nm), UVC (240–270 nm), and UVV (390–450 nm) bandwidths. If desired, the radiometer may be calibrated to detect radiation in one or more portions of these bandwidths. To cover this wide dynamic range, the control software of the radiometer is preferably written to automatically "float" the decimal point in the LCD as much as three places as necessary and depending upon which unit of measure is selected. The LCD display allows a user to switch between Watts-Joules-Seconds during data collection and after a reading or run has been made.

The SELECT button 106 (FIG. 1) allows the user to cycle between values. When collecting irradiance data, the display will change as the probe changes position under the UV source. As aperture 204 (FIG. 2) moves into the focused peak irradiance area of the UV source, the reading will increase. The LCD display will automatically scale and adjust as the readings are taken.

Pressing the RUN/STOP button 107 (FIG. 1) will stop the collection of data and the highest irradiance value measured during the collection of data will be displayed. Accumulated UV energy, or "dose," incorporates time into the irradiance measurement (i.e., measurement of the radiant power arriving at a surface per unit area. The invention may use a square centimeter as this unit area.) The LCD displays the dose value in Joules/cm$^2$ (J/cm$^2$). This dose is an integration of irradiance with respect to time, so the dose reading increases as the reading continues. The speed at which the dose reading increases depends on the irradiance value. Switching to the built-in timer helps to monitor the time component of the dose reading for more consistent results.

Placement of the probe in the same location is important in order to obtain consistent and repeatable irradiance values to calculate dose readings. The square cross-section of the probe which, when inserted into an opening with a matching square shape, insures accurate placement of the probe.

Figure 4:
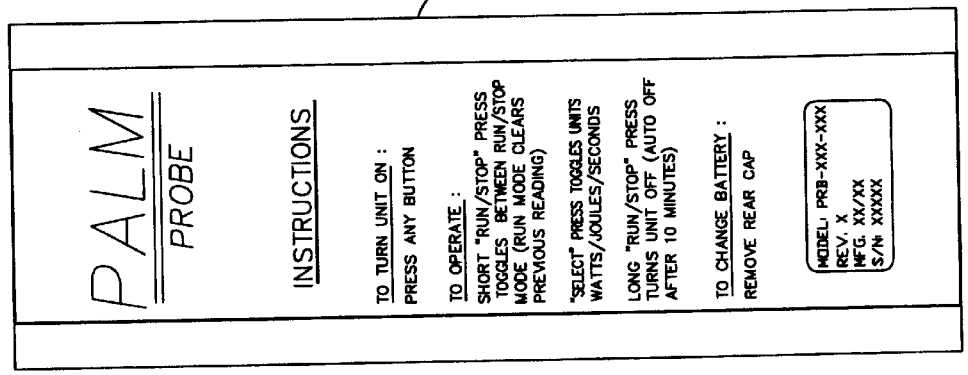
FIG. 4 is are perspective view of each surface of the body of the radiometer of the present invention.
Figure 4:
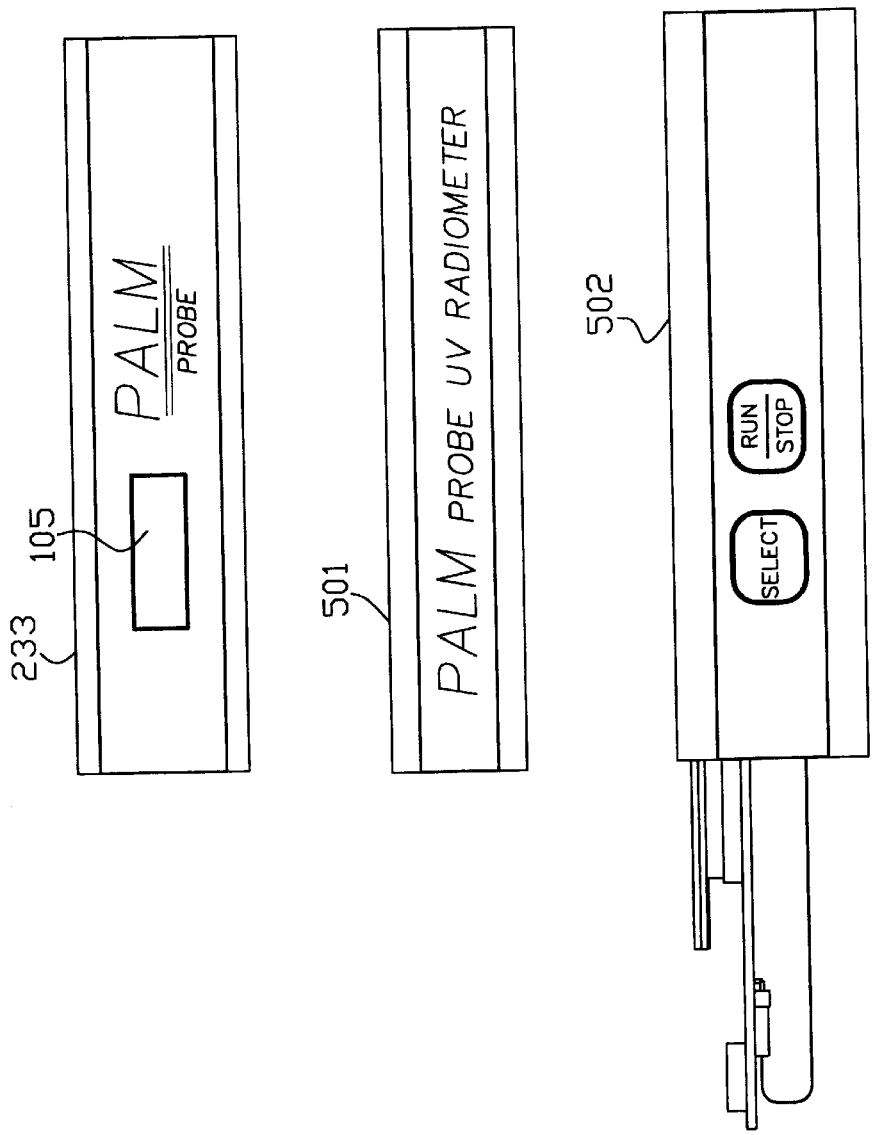

FIG. 4 shows perspective views of each side of the probe body, including sides 501 and 502, a top surface 233, and a bottom surface 504. Preferably, at least one of these surfaces includes printed information that instructs a user on how to use the radiometer. Other information may also be included such as contact information, serial number, model number, etc.

Figure 5:
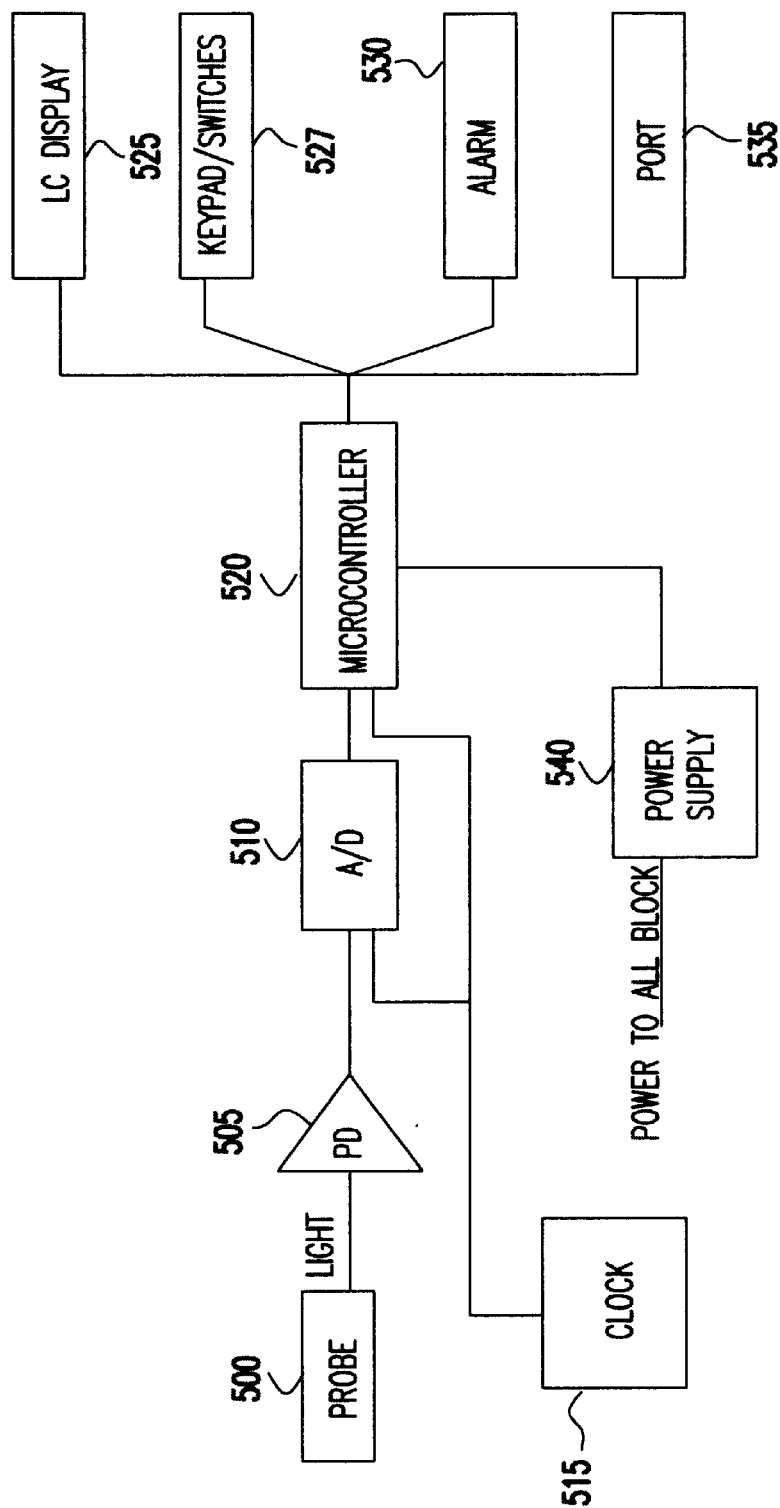
FIG. 5 shows a block diagram of the circuitry used to control the probe style radiometer of the present invention.

FIG. 5 is a block diagram of the circuitry included in the device of the present invention for detecting UV radiation. Referring to both of these figures, the method begins by inserting the probe rod 500 into an area where UV light is to be detected. Once inserted, light of all wavelengths enter into the aperture at the probe tip. The diffuser window at the tip converts the light into a cosine, or near cosine, response. The diffuse light travels through the interior of the probe rod, through a UV-band filter, and into a UV-responsive photodiode 505. The photodiode detects this filtered light and converts it into an analog signal current.

The analog signal is then input into an analog-to-digital (A/D) converter 510 which may be a Burr-Brown DDC 112 A/D converter. The AID converter preferably converts the signal into 20-bit digital data at a 2 KHz data rate. The convertor also provides digitally controlled gain switching over a predetermined (e.g., 60-to-1) range, and may be driven by a clock generator 515 such as a 2.5 ppm, 10.0 MHz TCXO, Maxim MAX998 comparator which generates a low-phase noise with a high stability 10 MHz clock signal with a 50% duty cycle. The resulting output from the A/D converter, thus, has a resolution of 20 bits, an effective resolution of 25/26 bits, and an output rate of 2000 Hz.

The A/D controller outputs its digital data to a microcontroller 520, which, for example, may be a Texas Instrument MSP4300P337 processor chip or other having a sample rate of, for example, 5 Hz. The microcontroller 520 performs all digital control and interface functions of the invention, including digital timing and control of the A/D converter, digital filtering of the A/D data, all keypad and switch interface and control 527, all LCD display drive and control functions 525, and all serial interface functions. The microcontroller may also implement and store calibration constants, and also may perform all power control functions.

In controlling the display driver, the microcontroller outputs LCD drive signals for causing the LCD 525 to display a detected UV reading. As previously explained, this LCD may be a multi-digit, seven segment liquid crystal display with annunciators. The device may also include an alarm buzzer (e.g., a piezoelectric buzzer) 530 which is controlled by the microcontroller to produce an audible tone to alert a user of various warning conditions. The device may also include one or more interfaces including an RS-232 port 535 for receiving or conveying serial digital data from, for example, an external device. The port may be a Maxim MAX221 used as a user/diagnostic/calibration interface.

The device may also include a power supply 540 in the form of a battery pack may be included for power the microcontroller, which incidentally is also driven by the clock generator. The power supply may also be Maxim MAX848 which converts unregulated battery voltage to regulated +5 Vdc. The supply may also switch the high power analog supply voltage on/off under digital control, and provide a digital output of the batteries voltage level. The supply may also switch between high-power and low-power modes of operation under digital control, to provide reverse battery protection. The resulting output is a regulated power, digital battery level sufficient for driving the microcontroller. The device also includes a memory unit (e.g., an EEPROM) for storing UV measurement data as well as temperature readings, battery level, and other types of information.

The radiometer of the present invention displays the energy density or dose values in Joules or milliJoules per square centimeter on the LCD. Pushing the SELECT button will cycle the display from Watts to Joules while the unit is in the Run or Stop mode. The dose value is the summation of irradiance values over a given elapsed time. For a given time exposure, the higher the irradiance values the higher the UV energy density or dose. The floating decimal point on the LCD allows for display of energy density at 0.001 mJ/cm$^2$ or 1 $\mu$J/cm$^2$. With this floating point system, the invention can display up to 9995 Joules/cm$^2$.

To aid in the UV radiation measuring process, the electronics in the body may include a timer which tells a user how long the probe is to be left in the UV measuring region. This time may be adjusted based on the substrate being cured, the application process, and UV chemistry being used. Operating within this time "window" will optimize UV radiation measurements.

Figure 3:
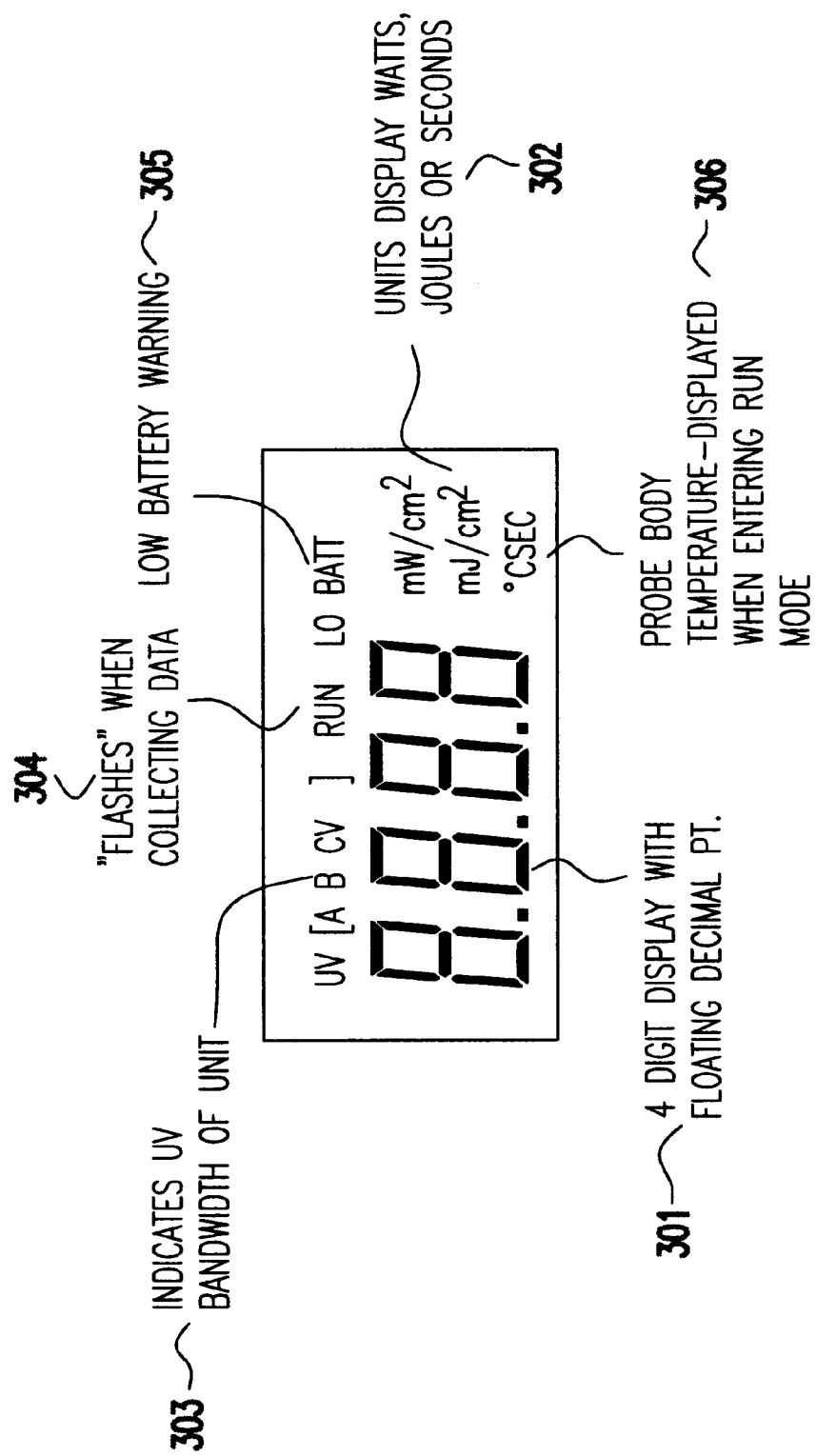
FIG. 3 is a plan view of the display on the upper surface of the body of the probe style radiometer.

The radiometer of the present invention may include a number of optional features. For example, the control software may support a batter-low function which detects battery level and then warns a user on the LCD of this condition. (FIG. 3). Also, the software may cause the radiometer to enter a passive, battery saving, or off mode if not used within a predetermined period of time. In this case, the last reading taken by the radiometer may be saved in memory before this mode is entered. Pushing any button may cause the unit to turn back on and display the last reading. The radiometer may also be equipped with an audible beeper which sound any time one of the control switches are depressed. The control software may also be written to continuously display the operating mode or status of the radiometer, and/or may provide a series of interactive menu options for guiding a user during operation.

Figure 6:
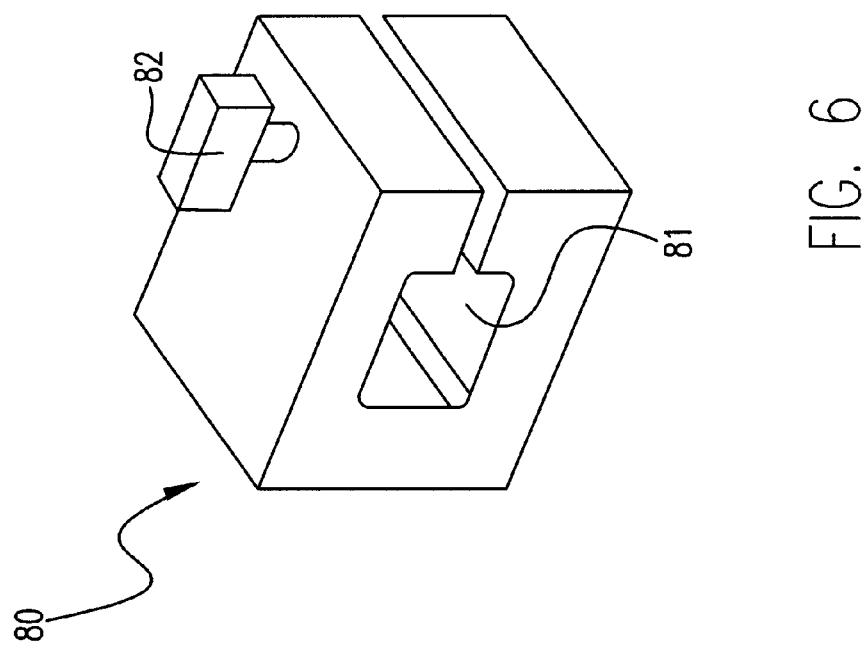
FIG. 6 is a diagram showing a locking ring adapted to fit onto the probe for guiding insertion of the probe distal end into a UV measuring region.

FIG. 6 shows a locking ring 80 adapted to fit onto the probe for guiding insertion of the probe distal end into, for example, a rectangular or square opening of a UV curing chamber. This locking ring includes an aperture 81 which has a shape which complements the cross-section of the probe rod, which in this case is square. A locking tab 82 is also included which, when tightened, causes the ring to grip the outer surface of the probe rod, thereby providing a secure fit. The locking ring is advantageous because slides over the probe rod, thereby ensuring consistent placement of the probe during each measuring session and thus resulting in a more accurate reading.

While the invention has been described in terms of a single preferred embodiment, those skilled in the art will recognize that the invention can be practiced with modification within the spirit and scope of the appended claims. For example, according to another embodiment of the invention the probe rod may have a substantially circular cross-section with an outer surface coating made from a material which protects a user of the radiometer from electrical shock and which also prevents electrical arcing.

Having thus described our invention, what we claim as new and desire to secure by Letters Patent is as follows:

1. A probe-style radiometer, comprising:
    a body;
    a probe, attached to said body, for collecting ultraviolet radiation in an area, said probe comprising a tube having means for reflecting and scattering received light therein and a shape for constraining motion of said probe when inserted in an aperture of similar shape;
    a detector in said body for detecting the ultraviolet radiation collected by said probe; and
    a controller which processes signals from said detector for determining an amount of the ultraviolet radiation in said area.

2. The probe-style radiometer of claim 1, wherein said probe includes a rigid tube having an electrically non-conductive outer coating, said tube passing the ultraviolet radiation collected by said probe to said detector.

3. The probe-style radiometer of claim 2, wherein said rigid tube is made of a conductive material.

4. The probe-style radiometer of claim 1, wherein said probe detects ultraviolet radiation in a range of approximately 100 $\mu$Watts/cm$^2$ to 10 Watts/cm$^2$ in a UV 280–445 nanometer (nm) bandwidth.

5. The probe-style radiometer of claim 1, wherein said controller causes said probe to selectively detect ultraviolet radiation in at least one portion of a 280–445 nanometer (nm) bandwidth.

6. The probe-style radiometer of claim 1, wherein said probe includes a hollow metal rod having at a distal end which includes:
    (a) an aperture which collects ultraviolet radiation;
    (b) a mirror which reflects the ultraviolet radiation collected by said aperture to a detector within said body; and
    (c) a diffuser window disposed between said aperture and said mirror within said rod.

7. The probe-style radiometer of claim 6, wherein said diffuser window is connected to seal an interior of said hollow metal rod from external contamination.

8. The probe-style radiometer of claim 6, wherein said diffuser window diffuses ultraviolet radiation collected by said aperture in such a manner that an angular response of said probe is at least substantially cosine in nature.

9. The probe-style radiometer of claim 6, further comprising:
    an electrically non-conductive connector which connects said probe to said body.

10. The probe-style radiometer of claim 1, wherein said body is sized to fit a hand of a user.

11. The probe-style radiometer of claim 1, further comprising:
    a battery for powering said controller.

12. The probe-style radiometer of claim 1, wherein said body includes a display for displaying information indicative of the ultraviolet radiation detected by said probe.

13. The probe-style radiometer of claim 12, wherein said body includes switches for allowing a user to control operation of said radiometer.

14. The probe-style radiometer of claim 1, wherein said rod contains a light-guiding medium which guides the ultraviolet radiation to said detector.

15. The probe-style radiometer of claim 14, wherein said light-guiding medium is made from one of glass, quartz, or optical fibers.

16. The probe-style radiometer of claim 14, wherein said light-guiding medium has an outer surface which includes an insulating coating.

17. A probe-style radiometer, comprising:
    a body;
    a probe, attached to said body, for collecting ultraviolet radiation in an area, said probe having an electrically non-conductive coating which prevents electrical shock to a user holding said body and electrical arcing;
    a detector which detects the ultraviolet radiation collected by said probe; and
    a processor which processes signals from said detector to determine an amount of ultraviolet radiation in said area.

18. The probe-style radiometer of claim 17, wherein said probe has a substantially rectangular cross-section.

19. The probe-style radiometer of claim 18, wherein said probe includes a hollow rigid tube, said tube passing the ultraviolet radiation collected by said probe to said detector.

20. The probe-style radiometer of claim 19, wherein said hollow rigid tube is made of a conductive material.

21. The probe-style radiometer of claim 17, wherein said probe detects ultraviolet radiation in a range of approximately 100 $\mu$Watts/cm$^2$ to 10 Watts/cm$^2$ in a UV 280–445 nanometer (nm) bandwidth.

22. The probe-style radiometer of claim 17, wherein said probe includes a hollow metal rod having at a distal end which includes:
    (a) an aperture which collects ultraviolet radiation;
    (b) a mirror which reflects the ultraviolet radiation collected by said aperture to a detector within said body; and
    (c) a diffuser window disposed between said aperture and said mirror within said rod.

23. The probe-style radiometer of claim 22, wherein said diffuser window is connected to seal an interior of said hollow metal rod from external contamination.

24. The probe-style radiometer of claim 22, wherein said diffuser window diffuses ultraviolet radiation collected by said aperture in such a manner that an angular response of said probe is at least substantially cosine in nature.

25. The probe-style radiometer of claim 17, further comprising:
    an electrically non-conductive connector which connects said probe to said body.

26. The probe-style radiometer of claim 17, wherein said body is sized to fit a hand of a user.

27. The probe-style radiometer of claim 17, further comprising:
    a battery for powering said controller.

28. The probe-style radiometer of claim 17, wherein said body includes a display for displaying information indicative of the ultraviolet radiation detected by said probe.

29. The probe-style radiometer of claim 28, wherein said body includes switches for allowing a user to control operation of said radiometer.

30. A probe-style radiometer, comprising:
    a body;
    a probe, attached to said body, for collecting ultraviolet radiation, said probe including a rigid rod containing only reflecting and diffusing surfaces and elements therein which collects the ultraviolet radiation in an area;
    a detector which detects the ultraviolet radiation collected by said probe; and a processor which processes signals from said detector to determine an amount of ultraviolet radiation in said area.

31. The probe-style radiometer of claim 30, wherein said probe has a substantially rectangular cross-section.

32. The probe-style radiometer of claim 30, wherein said rigid rod is a hollow tube which passes the ultraviolet radiation to said detector.

33. The probe style radiometer of claim 32, wherein said hollow rigid rod is made from one of a conductive material and a non-conductive material.

34. The probe-style radiometer of claim 30, wherein said probe detects ultraviolet radiation in a range of approximately 100 Watts/cm$^2$ to 10 Watts/cm$^2$ in a UV 280–445 nanometer (nm) bandwidth.

35. The probe-style radiometer of claim 30, wherein said probe includes a hollow metal rod having at a distal end which includes:

(a) an aperture which collects ultraviolet radiation;

(b) a mirror which reflects the ultraviolet radiation collected by said aperture to a detector within said body; and (c) a diffuser window disposed between said aperture and said mirror within said rod.

36. The probe-style radiometer of claim 35, wherein said diffuser window is connected to seal an interior of said hollow metal rod from external contamination.

37. The probe-style radiometer of claim 35, wherein said diffuser window diffuses ultraviolet radiation collected by said aperture in such a manner that an angular response of said probe is at least substantially cosine in nature.

38. The probe-style radiometer of claim 35, further comprising:

an electrically non-conductive connector which connects said probe to said body.

39. The probe-style radiometer of claim 30, wherein said body is sized to fit a hand of a user.

40. The probe-style radiometer of claim 32, further comprising:

a battery for powering said controller.

41. The probe-style radiometer of claim 30, wherein said body includes a display for displaying information indicative of the ultraviolet radiation detected by said probe.

42. The probe-style radiometer of claim 41, wherein said body includes switches for allowing a user to control operation of said radiometer.

43. A probe-style radiometer, comprising:

a body;

a probe, attached to said body, for collecting ultraviolet radiation in an area, said probe having an outer coating of an insulating material which protects said radiometer from electrical shock or arcing;

a detector in said body for detecting the ultraviolet radiation collected by said probe; and a controller which processes signals from said detector for determining an amount of the ultraviolet radiation in said area.

44. The probe-style radiometer of claim 43, wherein said probe has a substantially circular cross-section.

45. The probe-style radiometer of claim 43, wherein said probe has a substantially rectangular cross-section.

* * * * *